United States Patent
Weh et al.

(10) Patent No.: US 11,608,044 B2
(45) Date of Patent: Mar. 21, 2023

(54) HYDRAULIC BLOCK FOR A HYDRAULIC POWER VEHICLE BRAKING SYSTEM

(71) Applicant: Robert Bosch GmbH, Stuttgart (DE)

(72) Inventors: Andreas Weh, Sulzberg (DE); Michael Wilcox, Charlston, SC (US); Shogo Miyoshi, Kempten (DE)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 16/698,141

(22) Filed: Nov. 27, 2019

(65) Prior Publication Data

US 2020/0172076 A1  Jun. 4, 2020

(30) Foreign Application Priority Data

Nov. 29, 2018  (DE) .......................... 102018220573.6

(51) Int. Cl.
  *B60T 17/00* (2006.01)
  *B60T 8/40* (2006.01)
  *B60T 8/17* (2006.01)

(52) U.S. Cl.
  CPC ............... *B60T 17/00* (2013.01); *B60T 8/17* (2013.01); *B60T 8/4081* (2013.01)

(58) Field of Classification Search
  CPC . B60T 7/042; B60T 7/043; B60T 7/12; B60T 8/326; B60T 8/368; B60T 8/4081; B60T 8/4872; B60T 13/66; B60T 13/662; B60T 13/686; B60T 13/745; B60T 13/62; B60T 13/165; B60T 13/146; B60T 13/142; B60T 13/74; B60T 17/00; B60T 17/02; B60T 17/04; B60T 17/18; B60T 17/22; B60T 17/221; B60T 2270/82; B60T 2270/402; B60T 2270/404; B60T 11/18; B60T 2220/04; B60T 8/172; B60T 8/343; F16D 2121/04; F16D 2121/24; B60L 7/26; B60L 7/042
  USPC .......................................................... 303/20
  See application file for complete search history.

(56) References Cited

U.S. PATENT DOCUMENTS

| | | | |
|---|---|---|---|
| 2007/0018498 A1* | 1/2007 | Nakazawa ............ | B60T 8/4081 303/119.3 |
| 2014/0216866 A1* | 8/2014 | Feigel .................... | B60T 17/00 188/156 |
| 2015/0158466 A1* | 6/2015 | Nakamura ............. | B60T 11/16 303/3 |

(Continued)

FOREIGN PATENT DOCUMENTS

| | | |
|---|---|---|
| WO | 2013/023953 A1 | 2/2013 |
| WO | 2017/137135 A1 | 8/2017 |

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A cuboidal hydraulic block of a hydraulic power unit of a slip-controlled power vehicle braking system includes a power cylinder borehole, a receptacle for a pedal travel simulator in parallel to the power cylinder borehole, perpendicularly through two large sides of the hydraulic block, and perpendicularly to a master brake cylinder borehole. The master brake cylinder borehole extends, in parallel to an upper transverse side, from one longitudinal side of the hydraulic block to an opposite longitudinal side of the hydraulic block. In an intended installation and usage position, an electrical plug connection is situated beneath a lower transverse side of the hydraulic block.

14 Claims, 1 Drawing Sheet

(56) References Cited

U.S. PATENT DOCUMENTS

| | | | |
|---|---|---|---|
| 2015/0298675 A1* | 10/2015 | Mayr | B60T 17/043 92/169.1 |
| 2016/0185330 A1* | 6/2016 | Lee | B60T 13/745 303/10 |
| 2017/0197601 A1* | 7/2017 | Schaefer | B60T 11/22 |
| 2018/0265060 A1* | 9/2018 | Maruo | B60T 8/368 |

* cited by examiner

HYDRAULIC BLOCK FOR A HYDRAULIC POWER VEHICLE BRAKING SYSTEM

CROSS-REFERENCE TO RELATED APPLICATIONS

The present application claims priority under 35 U.S.C. § 119 to DE 10 2018 220 573.6 filed in the Federal Republic of Germany on Nov. 29, 2018, the content of which is hereby incorporated by reference herein in its entirety.

FIELD OF THE INVENTION

The present invention relates to a cuboidal hydraulic block having Cartesian boreholes for a hydraulic power unit of a hydraulic power vehicle braking system.

BACKGROUND

International patent application WO 2013/023953 A1 describes a hydraulic power unit of a slip-controlled hydraulic power vehicle braking system including a cuboidal hydraulic block which includes, among other things, receptacles for solenoid valves of the slip control unit, a master brake cylinder borehole, a power cylinder borehole, and a receptacle for a so-called pedal travel simulator. The master brake cylinder borehole is continuously provided from one to an opposing longitudinal side, the power cylinder borehole is perpendicularly provided continuously through two opposing large sides, and the receptacle for the pedal travel simulator is provided in parallel to the master brake cylinder borehole close to a lower transverse side of the hydraulic block in the hydraulic block.

International patent application WO 2017/137135 A1 discloses a hydraulic block for a hydraulic power unit of a slip-controlled hydraulic power vehicle braking system including a hydraulic block which is also cuboidal, in which a master brake cylinder borehole is also continuously provided from one to an opposing longitudinal side, a power cylinder borehole is also perpendicularly provided continuously through two opposing large sides, and, deviating from the aforementioned document, a receptacle for the pedal travel simulator is provided perpendicularly both to the master brake cylinder borehole and perpendicularly to the power cylinder borehole, next to the power cylinder borehole, perpendicularly in a lower transverse side of the hydraulic block.

SUMMARY

According to an example embodiment of the present invention, a hydraulic block is provided for a hydraulic power unit of a hydraulic power vehicle braking system which, in particular, includes a slip control unit. A significant piece of hydraulic power vehicle braking systems which include a slip control unit is a hydraulic power unit including a hydraulic block to which hydraulic wheel brakes of the vehicle braking system are connected by brake lines. Slip control units, also colloquially referred to as "anti-skid control units," are, in particular, an anti-lock braking unit (ABS), a traction control unit (TCS), and/or a vehicle dynamics control unit/electronic stability program (VDC/ESP). Slip control units are known and are not discussed in greater detail here.

The hydraulic block is used to mechanically attach and hydraulically interconnect hydraulic components of the vehicle braking system or their slip control unit. Such hydraulic components are, among other things, solenoid valves, check valves, hydraulic accumulators, damper chambers, pressure sensors, and a power braking pressure generator, the power braking pressure generator usually including a piston-cylinder unit which is or is to be accommodated in a power cylinder borehole of the hydraulic block. A piston of the piston-cylinder unit of the power braking pressure generator is often also referred to as a plunger piston, and the power cylinder borehole as a plunger receptacle, a plunger borehole, or the like. For a pressure generation, the piston of the power braking pressure generator is electromechanically displaced in the cylinder using an electric motor, which is or is to be attached to the outside of the hydraulic block, using a threaded drive or a rotatory/translatory transition gear in general, it being possible for a mechanical reducing gear, in particular a planetary gear, to be interconnected between the electric motor and the threaded drive or the transition gear. The power cylinder borehole in the hydraulic block can form the cylinder of the power braking pressure generator; or a cylinder, a cylinder liner, or the like can be situated on or in the power cylinder borehole. The power cylinder borehole can also be interpreted as a receptacle for the piston or the piston-cylinder unit of the power braking pressure generator.

The hydraulic components are attached in receptacles in the hydraulic block, which are usually designed as cylindrical through-holes or blind holes, partially with stepped diameters. "Interconnected" means that the receptacles or the hydraulic components attached therein are connected by lines in the hydraulic block corresponding to a hydraulic diagram of the vehicle braking system or its slip control unit. The lines are typically drilled in the hydraulic block.

Equipped with the hydraulic components of the vehicle braking system or its slip control unit, the hydraulic block forms a hydraulic power unit, "equipped" meaning that the hydraulic components are attached in the respective receptacles of the hydraulic block intended for them.

The hydraulic block according to the present invention is cuboidal and includes Cartesian boreholes; in particular, it is made up of metal. "Cartesian boreholes" means that the receptacles for the hydraulic components and the lines are attached in the hydraulic block in parallel and perpendicularly to one another and to surfaces and edges of the hydraulic block. Individual oblique receptacles and/or lines are possible. "Perpendicular" here refers not only to straight lines, axes, boreholes, cylinders, and the like which, or whose axes, intersect one another perpendicularly, but also straight lines, axes, boreholes, cylinders, and the like which, or whose axes, extend in parallel to a radial of a reference straight line, axis, borehole, cylinder or the like.

The hydraulic block according to the present invention includes a master brake cylinder borehole, the power cylinder borehole, and a receptacle for a pedal travel simulator. The master brake cylinder borehole is provided for one or multiple piston(s) of a master brake cylinder for a muscle power or auxiliary force actuation of the vehicle braking system, i.e., one of the pistons is mechanically displaceable in the master brake cylinder borehole using a (foot) brake pedal or a (hand) brake lever in the master brake cylinder borehole. For an auxiliary force actuation, a vacuum, an electromechanical, or another brake booster is present, which boosts a muscle power exerted on the piston. The piston(s) can be displaceably accommodated directly in the master brake cylinder borehole of the hydraulic block, or a cylinder, a cylinder liner, or the like is situated on or in the power brake cylinder borehole, in which the piston(s) is/are displaceable.

The hydraulic block or a portion of the hydraulic block surrounding the master brake cylinder borehole forms a master brake cylinder.

The power cylinder borehole is used to accommodate the piston of a power braking pressure generator, as was already explained above. The piston of the power braking pressure generator is often also referred to as a plunger piston. For a braking pressure generation, the piston is electromechanically displaceable in the power cylinder borehole using an electric motor using a threaded drive or in another manner via an external force. The piston can be directly displaceable in the power cylinder borehole or is displaceable in a cylinder, a cylinder liner, or the like, which is situated on or in the power cylinder borehole of the hydraulic block.

According to the present invention, the power cylinder borehole extends perpendicularly to the master brake cylinder borehole.

The receptacle for the pedal travel simulator is a cavity in the hydraulic block according to the present invention in which the pedal travel simulator is completely or partially situatable. In the latter case, the pedal travel simulator protrudes from the hydraulic block. Typically, the pedal travel simulator includes a piston, which is displaceable in the receptacle. In this case, the receptacle is typically a cylindrical counterbore, a cylindrical blind hole, and possibly also a cylindrical through-hole. The receptacle for the pedal travel simulator can have stepped diameters. The piston of the pedal travel simulator can be directly displaceable in the receptacle or is displaceable in a cylinder, a cylinder liner, or the like, which is situated on or in the receptacle for the pedal travel simulator in the hydraulic block. The piston of the pedal travel simulator is acted upon by a spring, gas pressure, or resiliently in another manner. It is connected to the master brake cylinder, preferably via a solenoid valve, which can also be referred to as a simulator valve, and is used to receive brake fluid from the master brake cylinder when the master brake cylinder is hydraulically disconnected from the vehicle braking system during a power operation of the vehicle braking system by the closing of a separating valve, so that no brake fluid can be displaced from the master brake cylinder into the vehicle braking system. The pedal travel simulator enables a displacement of the piston in the master brake cylinder during a power operation of the vehicle braking system, a force for the displacement of the piston usually increasing with increasing displacement travel. According to the present invention, other designs of the pedal travel simulator and a receptacle adapted thereto for the pedal travel simulator in the hydraulic block are also possible. According to the present invention, the receptacle for the pedal travel simulator is attached in parallel to the power cylinder borehole, and thus perpendicularly to the master brake cylinder borehole in the hydraulic block.

The arrangement according to the present invention of the master brake cylinder borehole, of the power cylinder borehole perpendicular thereto, and the receptacle for the pedal travel simulator, which is perpendicular to the master brake cylinder borehole and in parallel to the power cylinder borehole, enables a space-saving accommodation of these boreholes and receptacle in the hydraulic block and is also favorable for the boreholes of the hydraulic block.

All features disclosed in the description and the drawings can be implemented in example embodiments of the present invention either alone or in a generally arbitrary combination.

Embodiments of the present invention can also include fewer than all, for example one, of the features described herein.

The present invention is described in greater detail hereafter based on an example embodiment shown in the drawings. The figures are simplified and schematic illustrations to explain and provide an understanding of the present invention.

DETAILED DESCRIPTION

Figure 1:
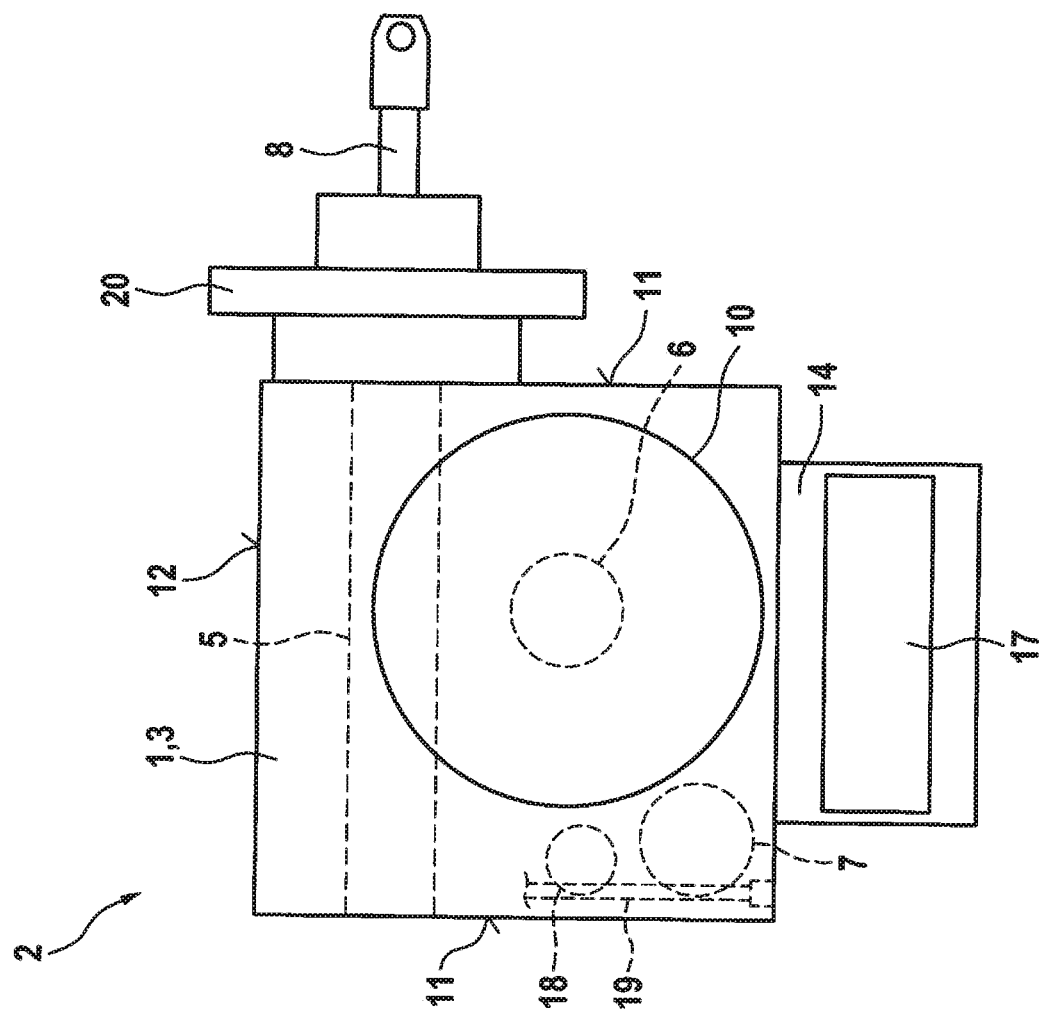
FIG. 1 shows a view of a longitudinal side of a hydraulic block according to an example embodiment of the present invention.
Figure 2:
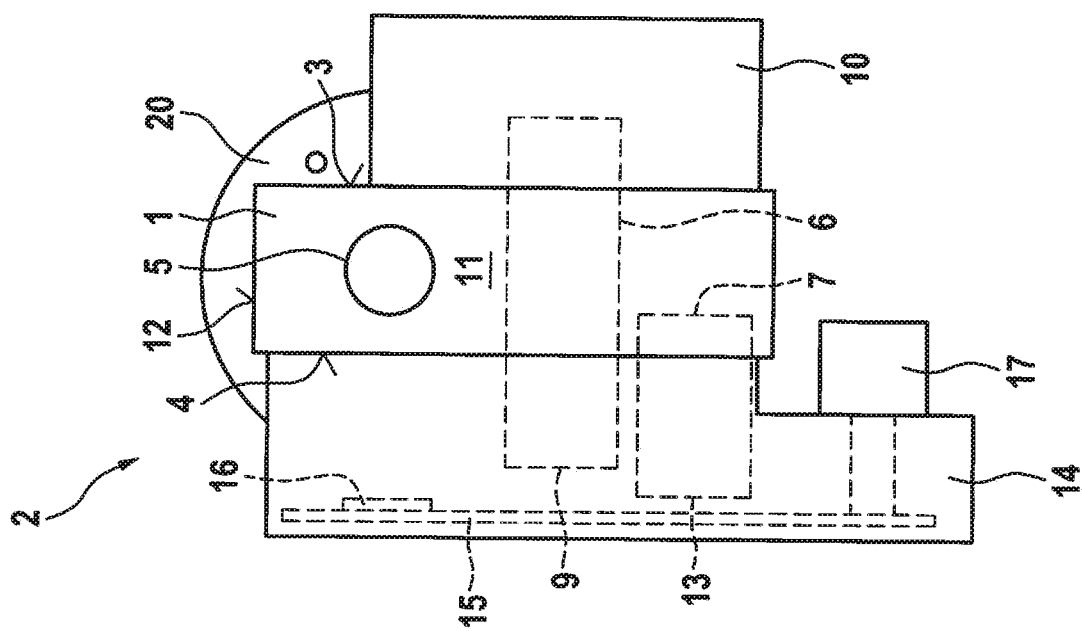
FIG. 2 shows a side view of the hydraulic block of FIG. 1, according to an example embodiment of the present invention.

The drawings show a hydraulic block 1 of a hydraulic power unit 2 of a hydraulic power vehicle braking system including a slip control unit, according to an example embodiment of the present invention. Such slip control units are, for example, anti-lock braking, traction control, and/or vehicle dynamics control units/electronic stability programs.

Hydraulic block 1 is a cuboidal metal block, which is wider and longer than thick in the terminology used here. In the shown and described example embodiment of the present invention, the hydraulic block 1 has almost square, mutually opposing large sides and is approximately three times as long or high and wide as it is thick. Other ratios of the sides are possible. One of the two large sides is referred to as a motor side 3 here, and the opposing large side as a control unit side 4. In the case of square large sides, longitudinal sides and transverse sides of hydraulic block 1 are equal in length. Rectangular large sides are also possible, it being possible for the longitudinal sides to be longer or shorter than the transverse sides.

Hydraulic block 1 is used for mechanically attaching and hydraulically interconnecting hydraulic components of the slip control unit, including a braking pressure control unit of the power vehicle braking system. Such hydraulic components are, among other things, solenoid valves, check valves, hydraulic accumulators, damper chambers, and pressure sensors, which are attached in receptacles in the hydraulic block. The receptacles are cylindrical counterbores, blind holes, and/or also through-holes, which can have stepped diameters and into which the hydraulic components are introduced and attached in a pressure-tight manner by, for example, a circumferential caulking. The hydraulic components can be recessed in the receptacles or protrude from hydraulic block 1. Equipped with the hydraulic components, an electric motor of a power braking pressure generator yet to be described, and an electronic control unit, hydraulic block 1 forms hydraulic power unit 2 for the braking pressure and slip control of the power vehicle braking system.

Hydraulic interconnection means that the receptacles for the hydraulic components are connected by lines leading through hydraulic block 1, corresponding to a hydraulic diagram of the power vehicle braking system or its slip control unit. The receptacles and lines form so-called "boreholes" of hydraulic block 1, it being generally also possible for the receptacles and lines to be created in a manner other than boring. The hydraulic block according to the present invention has Cartesian boreholes, which means that the receptacles for the hydraulic components and the lines connecting them extend in parallel and perpendicularly to one another and to sides and edges of the cuboidal hydraulic block 1. Individual receptacles and/or lines can also be provided obliquely in the hydraulic block 1.

Hydraulic block 1 according to the present invention includes a master brake cylinder borehole 5, a power cylinder borehole 6, and a receptacle 7 for a pedal travel simulator. Master brake cylinder borehole 5 and power cylinder borehole 6 are provided with cylindrical through-holes having stepped diameters and circumferential grooves, which are identified in a simplified manner as cylinders.

Master brake cylinder borehole 5 is used to displaceably accommodate one or multiple piston(s) of a master brake cylinder, which are not shown. A so-called primary or rod piston is displaced mechanically and by muscle power using a foot brake pedal, which is not shown, via a piston rod 8 or using a parking brake lever, which is not shown, in master brake cylinder borehole 5. The piston(s) can be displaceably accommodated directly in the master brake cylinder borehole 5, or a cylinder or a cylinder liner is situated, for example pressed, in power brake cylinder borehole 5, in which the piston(s) of the master brake cylinder is/are displaceably guided. Hydraulic block 1 or an area of hydraulic block 1 surrounding master brake cylinder borehole 5 can also be interpreted as a master brake cylinder.

Power cylinder borehole 6 is used to displaceably accommodate a piston of a power braking pressure generator, which is often also referred to as a plunger piston and is not shown. The piston of the power braking pressure generator can also be directly displaceable in power cylinder borehole 6. In the shown and described example embodiment of the present invention, a cylinder, which is referred to as power cylinder 9 here, is situated in power cylinder borehole 6. Power cylinder 9 protrudes from hydraulic block 1 on both large sides. This enables a power cylinder 9 which is axially longer than hydraulic block 1 is thick. It is also possible for a cylinder liner for guiding the piston in power cylinder borehole 6 to be provided.

For driving, i.e., for displacing, the piston in power cylinder 9, an electric motor 10 is attached coaxially to power cylinder borehole 6 on the outside of motor side 3 of hydraulic block 1. It displaces the piston via a planetary gear, which is not visible in the drawing, as a reducing gear, and a recirculating ball gear, which is also not visible, as a threaded drive. Electric motor 10, the reducing gear, the threaded drive, power cylinder 9, and the piston displaceable in power cylinder 9 form a power braking pressure generator for generating a hydraulic braking pressure for power braking.

Power cylinder borehole 6 is perpendicularly provided continuously in hydraulic block 1 from motor side 3 to control unit side 4. Master brake cylinder borehole 5 is provided perpendicularly to power cylinder borehole 6, perpendicularly continuously from a longitudinal side 11 to an opposing longitudinal side 11 in hydraulic block 1. Master brake cylinder borehole 5 extends in parallel to transverse sides 12 and the two large sides of hydraulic block 1, referred to as motor side 3 and control unit side 4 here. Master brake cylinder borehole 5 is situated between a transverse side 12 and power cylinder borehole 6 in hydraulic block 1, and in particular in the shown and described example embodiment of the present invention between transverse side 12, which is situated further away from power cylinder borehole 6, and power cylinder borehole 6.

Receptacle 7 for the pedal travel simulator is a cylindrical counterbore or a cylindrical blind hole, which is provided perpendicularly in one of the two large sides, in the shown and described example embodiment of the present invention in control unit side 4 of hydraulic block 1. Receptacle 7 for the pedal travel simulator is thus provided in parallel to power cylinder borehole 6 and perpendicularly to master brake cylinder borehole 5 in hydraulic block 1. As viewed perpendicularly to longitudinal sides 11 of hydraulic block 1, i.e., in the viewing direction of FIG. 1, receptacle 7 for the pedal travel simulator is situated between power cylinder borehole 6 and a transverse side 12, or on a side of power cylinder borehole 6 situated opposite master brake cylinder borehole 5. A cylindrical, cup-shaped cover is attached to hydraulic block 1 on control unit side 4 coaxially to receptacle 7 and can also be interpreted as cylinder 13 of the pedal travel simulator. A piston of the pedal travel simulator, which is not visible in the drawing, is displaceably accommodated in receptacle 7 and cylinder 13 and is acted upon by a piston spring, which is also not visible, or by gas pressure. The pedal travel simulator is used to receive brake fluid from the master brake cylinder when the master brake cylinder is actuated during a power braking operation, a separating valve, which is not shown, being closed to hydraulically disconnect the master brake cylinder from the vehicle braking system. Brake fluid displaced from the master brake cylinder upon its actuation displaces the piston of the pedal travel simulator counter to its piston spring or the gas pressure, so that a force necessary to displace the piston in the master brake cylinder increases as usual with increasing piston travel.

A box-shaped control unit housing 14 is attached on control unit side 4 of hydraulic block 1, whose open side faces hydraulic block 1 and is closed by hydraulic block 1. Control unit housing 14 covers power cylinder 9, and cylinder 13 of the pedal travel simulator protects power cylinder 9 and cylinder 13 of the pedal travel simulator against water and corrosion by sealing on control unit side 4 of hydraulic block 1. Control unit housing 14 also covers armatures of solenoid valves of the slip control unit, which are not visible in the drawing and which protrude from hydraulic block 1 on control unit side 4. A circuit board 15 including one or multiple integrated circuit(s) and/or further electronic components, which form an electronic control unit 16, is situated in control unit housing 14. Electronic control unit 16 receives signals, among other things, from the pressure sensors of the slip control unit and electric motor 10 of the power braking pressure generator and controls or regulates electric motor 10 and solenoid valves and similar hydraulic components of the slip control unit.

A multi-pole electrical plug connection 17 for electronic control unit 16 and a power supply unit of electric motor 10 is integrally formed on control unit housing 14. Plug connection 17 protrudes over hydraulic block 1 on a lower transverse side 12 and is accessible for the insertion of a mating connector, which is not shown, from the direction of motor side 3. Transverse side 12 of hydraulic block 1 which is situated at the bottom in the shown position of hydraulic block 1 or of hydraulic power unit 2 is referred to as lower transverse side 12. The shown position of hydraulic block 1 or of hydraulic power unit 2 is an intended installation and usage position of hydraulic block 1 or of hydraulic power unit 2. As is apparent from the drawings, plug connection 17 is situated beneath hydraulic block 1 in the intended installation and usage position.

Also on control unit side 4 and covered by control unit housing 14, hydraulic block 1 includes a receptacle 18 for a simulator valve, which is not shown. By opening the simulator valve, the master brake cylinder is hydraulically connectable to receptacle 7 for the pedal travel simulator for power braking. A line 19, which extends through hydraulic block 1 in parallel to longitudinal sides 11 and close to one of the two longitudinal sides 11, tangentially intersects receptacle 7 for the pedal travel simulator and receptacle 18 for the simulator valve and connects these two receptacles 7, 18 to each other.

On longitudinal side 11 of hydraulic block 1, from which piston rod 8 protrudes, an attachment flange 20 for a screw attachment of hydraulic power unit 2 is provided on hydraulic block 1 on a bulkhead of a motor vehicle, which is not shown. Attachment flange 20 includes a central hole through which piston rod 8 extends.

What is claimed is:

1. A cuboidal hydraulic block for a hydraulic power unit of a hydraulic power vehicle braking system, the cuboidal hydraulic block comprising Cartesian boreholes that include:
    a master brake cylinder borehole;
    a power cylinder borehole that is perpendicular to the master brake cylinder borehole; and
    a receptacle for a pedal travel simulator, the receptacle for the pedal travel simulator being arranged in parallel to the power cylinder borehole;
    wherein the cuboidal hydraulic block includes at least one of the following four features (1)-(2):
        (1) the cuboidal hydraulic block further comprises a receptacle for a simulator valve, the receptacle for the pedal travel simulator and the receptacle for the simulator valve being connected to each other by a line that extends through the hydraulic block and that tangentially intersects the receptacle for the pedal travel simulator;
        (2) the cuboidal hydraulic block further comprises a control unit housing, and at least one of the following:
            (I) the control unit housing covers an opening of the receptable for the pedal travel simulator; and
            (II) (i) the power cylinder borehole and the receptacle for the pedal travel simulator extend perpendicularly to first and second surfaces of the hydraulic block, (ii) the master brake cylinder borehole is provided: below a first transverse side of the hydraulic block that extends between the first and second surfaces, and between (a) the first transverse side and (b) a first side of the power cylinder borehole, (iii) the receptacle for the pedal travel simulator is provided: above a second transverse side of the hydraulic block that extends between the first and second surfaces, and between (a) a second side of the power cylinder borehole, which is opposite the first side of the power cylinder borehole, and (b) the second transverse side, and (iv) the control unit housing has a terminal connection to a plug connection that is situated outside of the hydraulic block and entirely below the second transverse side.

2. The cuboidal hydraulic block of claim 1, wherein:
    the power cylinder borehole and the receptacle for the pedal travel simulator extend perpendicularly to first and second surfaces of the hydraulic block;
    the master brake cylinder borehole is provided between (a) a first transverse side of the hydraulic block that extends between the first and second surfaces, and (b) a first side of the power cylinder borehole; and
    the receptacle for the pedal travel simulator is provided between (a) a second side of the power cylinder borehole, which is opposite the first side of the power cylinder borehole, and (b) a second transverse side of the hydraulic block that extends between the first and second surfaces.

3. The cuboidal hydraulic block of claim 2, wherein, in an intended installation and usage position of the hydraulic block, the second transverse side of the hydraulic block is a bottom side of the hydraulic block.

4. The cuboidal hydraulic block of claim 1, further comprising the receptacle for the simulator valve, wherein the receptacle for the pedal travel simulator and the receptacle for the simulator valve are connected to each other by the line extending through the hydraulic block.

5. The cuboidal hydraulic block of claim 4, wherein the line connecting the receptacle for the pedal travel simulator to the receptacle for the simulator valve tangentially intersects the receptacle for the pedal travel simulator.

6. The cuboidal hydraulic block of claim 1, wherein:
    the power cylinder borehole and the receptacle for the pedal travel simulator extend perpendicularly to the first and second surfaces of the hydraulic block;
    the master brake cylinder borehole is provided:
        below the first transverse side of the hydraulic block that extends between the first and second surfaces; and
        between (a) the first transverse side and (b) a first side of the power cylinder borehole; and
    the receptacle for the pedal travel simulator is provided:
        between (a) the second side of the power cylinder borehole, which is opposite the first side of the power cylinder borehole, and (b) the second transverse side of the hydraulic block that extends between the first and second surfaces; and
        above the second transverse side.

7. The cuboidal hydraulic block of claim 6, further comprising the control unit housing having the terminal connection to the plug connection that is situated outside of the hydraulic block and entirely below the second transverse side.

8. The cuboidal hydraulic block of claim 7, wherein the control unit housing covers the opening of the receptacle for the pedal travel simulator.

9. The cuboidal hydraulic block of claim 1, further comprising the control unit housing covering the opening of the receptacle for the pedal travel simulator.

10. The cuboidal hydraulic block of claim 9, further comprising an electronic control unit housed by the control unit housing.

11. A hydraulic component for a hydraulic power unit of a hydraulic power vehicle braking system, the hydraulic component comprising:
    a control unit; and
    a cuboidal hydraulic block comprising Cartesian boreholes that include:
        a master brake cylinder borehole;
        a power cylinder borehole that is perpendicular to the master brake cylinder borehole; and
        a receptacle for a pedal travel simulator, the receptacle for the pedal travel simulator being arranged in parallel to the power cylinder borehole;
    wherein:
        the power cylinder borehole and the receptacle for the pedal travel simulator extend perpendicularly to first and second surfaces of the hydraulic block;
        the master brake cylinder borehole is provided:

below a first transverse side of the hydraulic block that extends between the first and second surfaces; and between (a) the first transverse side and (b) a first side of the power cylinder borehole;

the receptacle for the pedal travel cylinder is provided:

between (a) a second side of the power cylinder borehole, which is opposite the first side of the power cylinder borehole, and (b) a second transverse side of the hydraulic block that extends between the first and second surfaces; and above the second transverse side; and the control unit includes a multi-pole electrical plug connection that is situated outside the hydraulic block entirely below the second transverse side.

12. The hydraulic component of claim 11, further comprising a control unit housing in which the control unit is housed, the control unit housing covering an opening of the receptacle for the pedal travel simulator.

13. The hydraulic component of claim 11, further comprising a receptacle for a simulator valve, wherein the receptacle for the pedal travel simulator and the receptacle for the simulator valve are connected by a line extending through the hydraulic block.

14. The hydraulic component of claim 13, wherein the line connecting the receptacle for the pedal travel simulator to the receptacle for the simulator valve tangentially intersects the receptacle for the pedal travel simulator.

* * * * *